(12) United States Patent
Stretton et al.

(10) Patent No.: US 9,387,923 B2
(45) Date of Patent: Jul. 12, 2016

(54) GAS TURBINE ENGINE

(71) Applicant: ROLLS-ROYCE PLC, London (GB)

(72) Inventors: Richard Geoffrey Stretton, Ashby-de-la-Zouch (GB); Nicholas Howarth, Derby (GB)

(73) Assignee: ROLLS-ROYCE plc, London (GB)

( * ) Notice: Subject to any disclaimer, the term of this patent is extended or adjusted under 35 U.S.C. 154(b) by 552 days.

(21) Appl. No.: 13/914,882

(22) Filed: Jun. 11, 2013

(65) Prior Publication Data

US 2014/0017067 A1     Jan. 16, 2014

(30) Foreign Application Priority Data

Jul. 12, 2012 (GB) .................................. 1212384.0

(51) Int. Cl.
*B64C 11/00* (2006.01)
*F02C 3/067* (2006.01)

(52) U.S. Cl.
CPC ................ *B64C 11/001* (2013.01); *F02C 3/067* (2013.01); *Y02T 50/671* (2013.01)

(58) Field of Classification Search
CPC ............ F02C 7/045; F02C 3/067; F02K 3/02; B64C 11/001; B64D 33/02; B64D 2033/0286; B64D 2033/0293
See application file for complete search history.

(56) References Cited

U.S. PATENT DOCUMENTS

| | | | |
|---|---|---|---|
| 3,477,231 A | 11/1969 | Paulson | |
| 3,820,628 A | 6/1974 | Hanson | |
| 3,981,466 A | 9/1976 | Shah | |
| 4,240,250 A * | 12/1980 | Harris | F02C 7/045 415/119 |
| 4,817,756 A | 4/1989 | Carr et al. | |
| 5,649,419 A * | 7/1997 | Schaut | F02C 7/045 181/214 |
| 2011/0305572 A1* | 12/2011 | Bellis | B64C 11/306 416/129 |

FOREIGN PATENT DOCUMENTS

GB     1 350 686     4/1974

OTHER PUBLICATIONS

Search Report issued in British Application No. 1212384.0 dated Nov. 1, 2012.

\* cited by examiner

*Primary Examiner* — Craig Kim
*Assistant Examiner* — Maxime Adjagbe
(74) *Attorney, Agent, or Firm* — Oliff PLC

(57) ABSTRACT

A gas turbine engine (10) having an axial flow direction (X) therethrough in use. The gas turbine engine (10) comprises one or more rotor stages each comprising at least one rotor blade (120) having a root portion (122). The gas turbine engine (10) comprises a shroud (122) located upstream of one or more of the rotor stages relative to the axial flow direction (X). The shroud (122) defines a through passageway (128) extending between an inlet (130) and an outlet (132) which comprises a diffuser region (138). The diffuser region (138) is configured to reduce the axial velocity of air exiting the outlet (132) relative to air entering the diffuser portion (138) in use, wherein the outlet (132) is located such that air exiting the outlet (132) is directed substantially to the root portion (122) only of the rotor blades (120).

18 Claims, 4 Drawing Sheets

GAS TURBINE ENGINE

The present invention relates to a gas turbine engine.

BACKGROUND TO THE INVENTION

Referring to FIG. 1, a conventional twin-spooled, contra-rotating propeller gas turbine engine, e.g. a "propfan", "turboprop" or "open rotor" engine, is generally indicated at 10 and has a principal rotational axis 9 and an axial flow direction X in use. The engine 10 comprises a core engine 11 having, in axial flow series, an air intake 12, a low pressure compressor 14, a high pressure compressor 15, combustion equipment 16, a high pressure turbine 17, a low pressure turbine 18, a free power turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller rotor stages 23, 24 attached to and driven by the free power turbine 19 via shaft 26. The configuration shown in FIG. 1 in which the propeller stages 23, 24 are located radially outwardly of a turbine stage 18 and perhaps slightly rearwardly of the free power turbine 19 towards the rear of the gas turbine engine 10 is termed a "pusher" configuration, as opposed to the "puller" or "tractor" configuration having the propeller stages 23, 24 towards the front of the engine 10, forward of one or both of the compressor stages 14, 15.

The gas turbine engine 10 works in a conventional manner so that air entering the intake 12 is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high pressure, low pressure and free power turbines 17, 18, 19 before being exhausted through the nozzle 20 to provide some propulsive thrust. The high pressure, low pressure and free power turbines 17, 18, 19 respectively drive the high and low pressure compressors 15, 14 and the propellers 23, 24 by suitable interconnecting shafts. The propellers 23, 24, powered by the low pressure turbine 19, normally provide the majority of the propulsive thrust. In the embodiments herein described the propellers 23, 24 rotate in opposite senses so that one rotates clockwise and the other anti-clockwise around the engine's rotational axis 9.

One problem with a conventional pusher propeller gas turbine engine 10 is that its cruise speed is limited to slightly below transonic, predominantly due to the drag rise encountered when flying at higher speeds. One of the main causes of this drag rise is that generally the root of each blade forming the propeller stages 23, 24 cannot be shaped with the thin profiles required for high speed. The root has to be thick enough to guarantee the structural robustness of the blades given the high aerodynamic and mechanical loads acting on the propeller stages 23, 24. The airflow passing between the relatively thick blade roots may easily become supersonic if the propeller gas turbine engine 10 operates at transonic cruise speed, around Mach 0.8. This results in disadvantageous increased noise, aerodynamic losses and possible mechanical excitation, phenomena which it is desirable to avoid or at least limit.

Similar problems can be encountered in turbofan engines, particularly where the ratio between the bypass airflow and the core airflow is large, and where the fan comprises variable pitch blades. A turbofan gas turbine engine 410 is shown in FIG. 2 and comprises an air intake 412 and a propulsive fan 414 that generates a core airflow A and a bypass airflow B. The gas turbine engine 410 comprises, in axial flow A, an intermediate pressure compressor 416, a high pressure compressor 418, a combustor 420, a high pressure turbine 422, an intermediate pressure turbine 424, a low pressure turbine 426 and an exhaust nozzle 428. A nacelle 430 surrounds the gas turbine engine 400 and defines, in axial flow B, a bypass duct 432.

The present invention therefore seeks to address some or all of these issues.

STATEMENTS OF INVENTION

According to a first aspect of the present invention, there is provided a gas turbine engine having an axial flow direction therethrough in use, the gas turbine engine comprising:
  one or more rotor stages each comprising at least one rotor blade, each rotor blade having a root portion;
  a shroud located upstream of one or more of the rotor stages relative to the axial flow direction;
  the shroud defining a through passageway extending between an inlet and an outlet, the shroud being configured to reduce the axial velocity of air exiting the outlet relative to air entering the inlet in use, wherein the outlet is configured to direct air exiting the outlet substantially towards the root portion of the rotor blades.

Accordingly, there is provided a gas turbine engine in which the velocity of the air flow arriving at the root of the blade is decreased relative to the freestream air arriving at outer sections of the blade. As a result, the thickness at the root of the blade can be made to be relatively thick for mechanical purposes, thereby increasing structural robustness without compromising aerodynamic efficiency. Alternatively, the aircraft can be flown at a higher speed using the same blade profile as prior designs while achieving similar structural robustness to previous designs.

The outlet may be configured to direct air exiting the outlet substantially towards only the root portion of the rotor blades.

The shroud may be mounted to a static structure of the gas turbine engine or to a static structure of an aircraft to which the gas turbine engine is mounted.

Where the shroud is mounted to a static structure of the gas turbine engine, the shroud may be mounted to a nacelle surrounding the engine core.

Alternatively, the shroud may be mounted to one of the rotor stages.

Where the shroud is mounted to one of the rotor stages, the rotor stage to which the shroud is mounted may comprise a hub, and the shroud is then mounted to the hub. The shroud may be mounted to the hub by at least one strut extending between the shroud and the hub.

The or each strut may comprise an aerofoil profile. The aerodynamic profile may contribute to the acceleration of air flowing through the shroud in use.

The or each strut may comprise a duct for transmitting fluid from the hub to the shroud. Such an arrangement could be used to transmit a de-icing fluid to the blade root for example, which has been found to be particularly prone to icing in use.

The shroud may comprise a duct having an inlet in fluid communication with the strut duct, and an outlet adjacent the outlet of the through passageway for transmitting fluid to a trailing edge of the shroud.

Where one or more of the rotor stages comprises a hub, the shroud may be located such that at least part of the passageway surrounds the hub.

The shroud may be generally annular. The shroud may comprise an aerofoil profile.

The passageway may comprise an acceleration region located upstream of a diffusion region, the acceleration region being configured to increase the axial velocity of the air flowing therethrough, and the diffusion region being configured to decrease the axial velocity of the air flowing therethrough. By providing an acceleration region upstream of the diffusion region, a greater amount of air can be captured by the shroud, and delivered to the root portion of the rotor blades.

The gas turbine engine may comprise a propeller gas turbine engine, and one or more of the rotor stages may comprise at least one propeller rotor.

Where the gas turbine engine comprises a propeller gas turbine engine, the gas turbine engine may comprise a pusher configuration, in which the at least one propeller rotor is mounted radially outwardly of a turbine stage of the gas turbine engine. Alternatively, the propeller gas turbine engine may comprise a puller configuration, in which the at least one propeller rotor is mounted axially forwardly of a compressor stage of the gas turbine engine.

Alternatively, the gas turbine engine may comprise a turbofan engine, wherein one or more of the rotor stages comprise a fan rotor which may comprise a variable pitch rotor. A variable pitch rotor is one in which the blades are able to rotate about their own longitudinal axis.

According to a further aspect of the present invention there is provided an aircraft comprising a gas turbine engine as described in the preceding sixteen paragraphs.

BRIEF DESCRIPTION OF THE DRAWINGS

The present invention will be more fully described by way of example with reference to the accompanying drawings, in which.

DETAILED DESCRIPTION OF THE PREFERRED EMBODIMENTS

Figure 1:
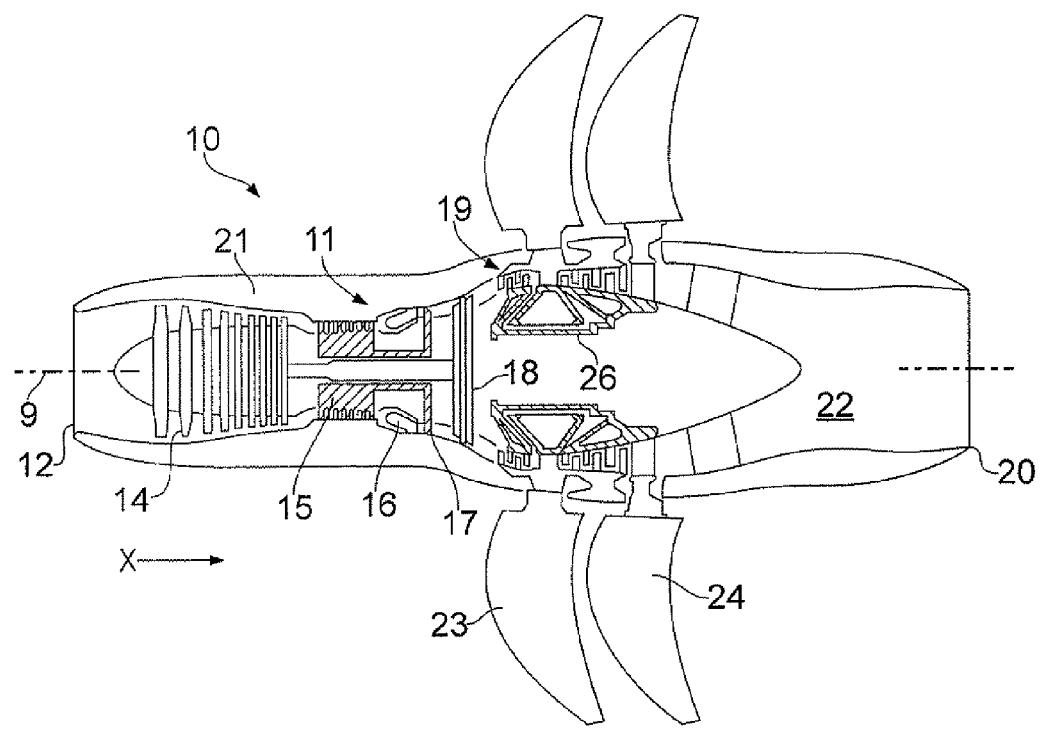
FIG. 1 is a diagrammatic cross sectional view of a pusher type propeller gas turbine engine.
Figure 3:
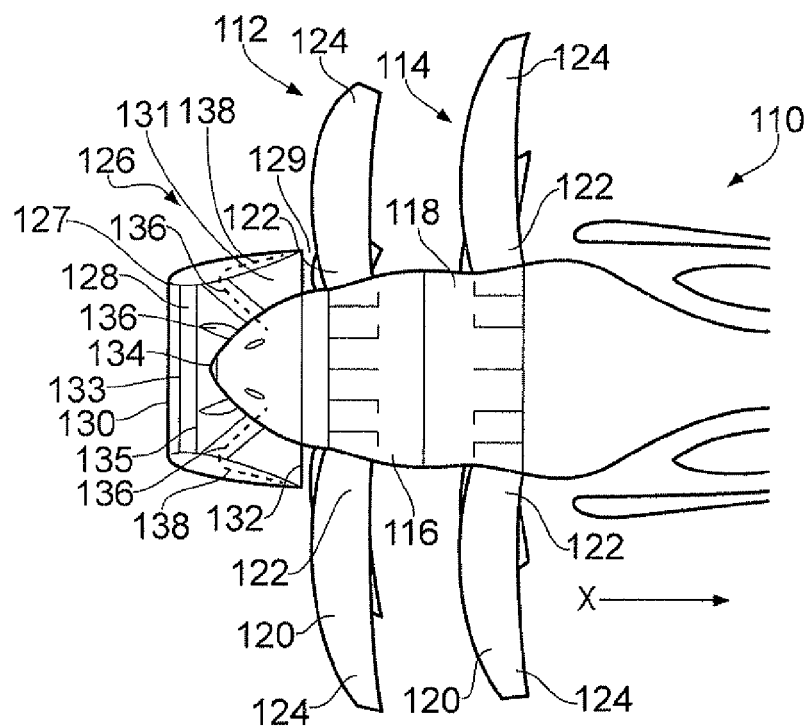
FIG. 3 is a diagrammatic cross sectional view of part of a puller type propeller gas turbine engine having a shroud.
Figure 4:
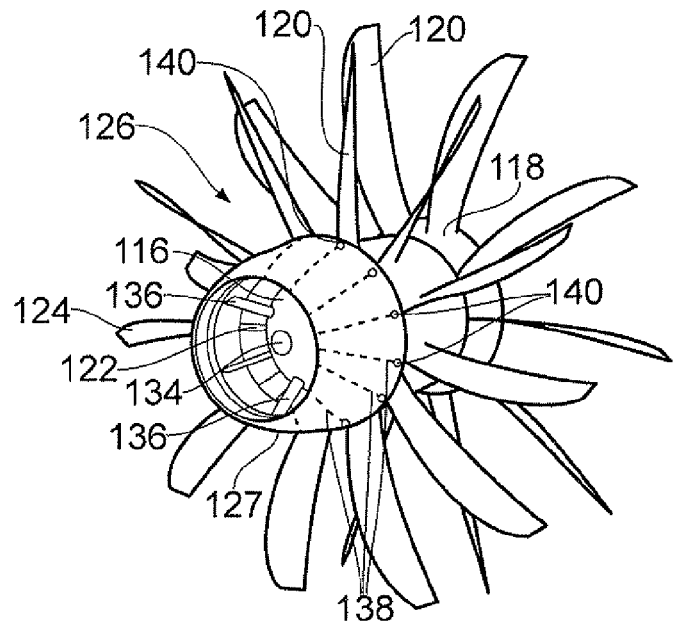
FIG. 4 is a perspective view of the part of the gas turbine engine shown in FIG. 3.

FIGS. 3 and 4 show a front part of a propeller gas turbine engine 110. The gas turbine engine 110 comprises compressor and turbine rotors, similar to compressors 14, 15 and turbines 17, 18 of the turboprop gas turbine engine 10 illustrated in FIG. 1.

The engine 110 comprises a pair of contra-rotating rotor stages 112, 114. Each rotor stage 112, 114 comprises a first hub comprising a nose cone 116, a second hub 118, and a plurality of blades 120 which extend radially from the respective hub 116, 118. The rotor stages 112, 114 are arranged with a first stage 112 located axially forwardly of a second stage 114. Both stages 112, 114 are driven by a gearbox (not shown) housed within the hub 116, 118, which is in turn driven by a prop shaft (not shown). The shaft is in turn driven by a low pressure turbine rotor.

Each rotor blade 120 comprises a root portion 122 and a radially outer portion 124. The root portion 122 of each blade 120 extends from the respective hub 116, 118 to a point part way radially outward of the blade 120. The radially outer portion 124 comprises the radially outer end of the blade 120 to the radially outer end of the root portion 122. Each blade 120 comprises an aerofoil profile, such that thrust is provided as the blades 120 rotate about the engine axis 9. The profile of the root portion 122 is generally thicker than the radially outer portion 124 (i.e. is wider when viewed from the leading edge of the blade 120) due to the mechanical attachment requirements for the root portion 122 and the structural stiffening around the root attachment to react the blade aerodynamic and mechanical loading (e.g. from foreign object impact). As a result of this increased thickness, there is a smaller gap between adjacent blades at the root portion 122 relative to the radially outer portion 124, such that air flowing past the root portion 122 will be accelerated to a greater extent than air flowing past the radially outer portion 124. Generally, the root portion 122 encompasses around 15% to 25% of the blade length, and the radially outer portion 124 encompasses the remainder of the blade length.

The gas turbine engine 110 comprises a shroud 126 having an annular aerofoil profile, i.e. having a longitudinal cross section having an aerofoil profile. The aerofoil in the described embodiment is non-cambered (i.e. is symmetrical about a centre line), though cambered aerofoil profiles could also be employed. The shroud 126 extends from a leading edge 127 to a trailing edge 129. The shroud 126 is generally annular and surrounds a part of the hub 116 of the first rotor stage 112. The shroud 126 is mounted to the nose cone 116 by a mounting arrangement such that it rotates with the nose cone 116 and rotor blades 120 of the first rotor stage 112 in use. The nose cone 116 and the shroud 126 together define a through passageway 128 which extends between an inlet 130 circumscribed by the leading edge 127 of the shroud 126, and an outlet 132 defined by the trailing edge 129 of the shroud 126 and the radially outer surface of the nose cone 116. In use, air can flow through the passageway 128 from the inlet 130 to the outlet 132 along the axial direction X. In this embodiment, the inlet 130 is located axially forwardly of the forward end 134 of the nose cone 116, and the outlet 132 is located forwardly of the blades 120 of the first rotor stage 112 such that air exiting the outlet 132 is directed toward the root portion 122 of the blades 120 of the first rotor stage 112. However, the inlet 130 could be located axially rearwardly of the forward end 134 of the nose cone 116, provided the outlet 132 is located forwardly of the blades 120 of the first rotor stage 112.

The through passageway 128 comprises an acceleration region 133 which extends axially from the inlet 130 to a throat region 135. The throat region 135 is that part of the passageway 128 having a minimum cross sectional area. The profile of the shroud 126 is arranged such that the acceleration region 133 converges from a first cross sectional area at the inlet 130, to a second, smaller cross sectional area at the throat region 135. As a result, air entering the inlet 130 of the shroud 126 is accelerated as it flows in the axial direction from the inlet 130 toward the throat area 135.

The through passageway 128 further comprises a diffusion region 131 which extends from the throat region 135 to the outlet 132. The profile of the shroud 126 and the hub 116 are arranged such that the diffusion region 131 diverges from the second area at the throat 135, to a third, larger cross sectional area at the outlet 132. As a result, air flowing through the diffusion region 131 in the axial direction X from the throat region 135 to the outlet 132 is decelerated. The acceleration region 133, throat 135 and diffusion region 131 are arranged such that air flowing through the passageway 128 is decelerated by the diffusion region 131 to a greater extent than it is accelerated by the acceleration region 133, such that the axial velocity of air exiting the outlet 132 is lower than that of air entering the inlet 130.

Once the air flows out of the outlet 132, it continues in a generally axial direction to the root portion 122 of the blades 120 of the first rotor stage 112. As a result of the shroud 126, the axial velocity of the air as it flows to the leading edge of the root portion 122 of the blades 120 is reduced to a lower velocity than the freestream air which flows to the leading edge of the radially outer portion 124 of the blades 120 of the first rotor stage 112. Since the passageway 128 has a radial extent commensurate with the root portion 122, the air exiting the outlet 132 of the passageway 128 is directed substantially towards the root portion 122 of the blades 120 only, such that the air flowing to the leading edge of the radially outer portion 124 of the blades 120 is substantially unaffected by the shroud 126, and will generally have the freestream or close to freestream axial velocity (i.e. has a velocity equal to the forward velocity of the engine). In some configurations, where the blades 120 are located within a boundary layer of an aircraft wing or fuselage, the axial velocity of the air approaching the leading edge of the radially outer portion 124 of the blades 120 may be greater or less than the freestream velocity. However, in any event, the axial velocity of the air approaching the root portion 122 of the blades 120 will be lower than the axial velocity of the air approaching the radially outer portion 124.

The shroud 126 is mounted to the hub 116 by a mounting arrangement comprising a plurality of spaced struts 136. Each strut 136 extends from an outer surface of the hub 116 to an inner surface of the shroud 126. Each strut 136 is aerodynamically profiled to minimise drag, and in this embodiment comprises an aerofoil profile. Since the struts 136 are attached to the hub 116, the struts 136 rotate at the same speed as the hub 116 in use and (in some cases) may be profiled to provide thrust as the hub 116 rotates. In one example, the struts 136 could be profiled to turn incoming flow to provide optimum flow to the leading edge of the root portion 122 of the blades 120, and could be arranged to align the flow exiting the outlet 132 exits with the same direction as the freestream air approaching the radially outer portion 124 of the blades 120.

Each strut 136 comprises a duct 138 (shown as dotted lines in FIGS. 3 and 4) which communicates with a supply of compressed air routed through the hub 116. The compressed air is in turn supplied to the hub 116 from a source such as a bleed from one of the compressor stages 14, 15. The ducts 138 continue through the shroud 126 to apertures 140 located on the trailing edge 129. In use, compressed air can therefore be provided to the leading edge of the blades 120 from the trailing edge 129 of the shroud 126. Since the compressor air is generally at a relative high temperature, the flow of compressed air from the apertures 140 can prevent ice from forming on the blades 120 and the struts 136. The relatively high velocity air from the apertures 140 can also reduce the axial extent of the wake from the trailing edge 129 of the shroud 126 by increasing the airflow velocity behind the trailing edge 129, which may otherwise increase drag.

Figure 5:
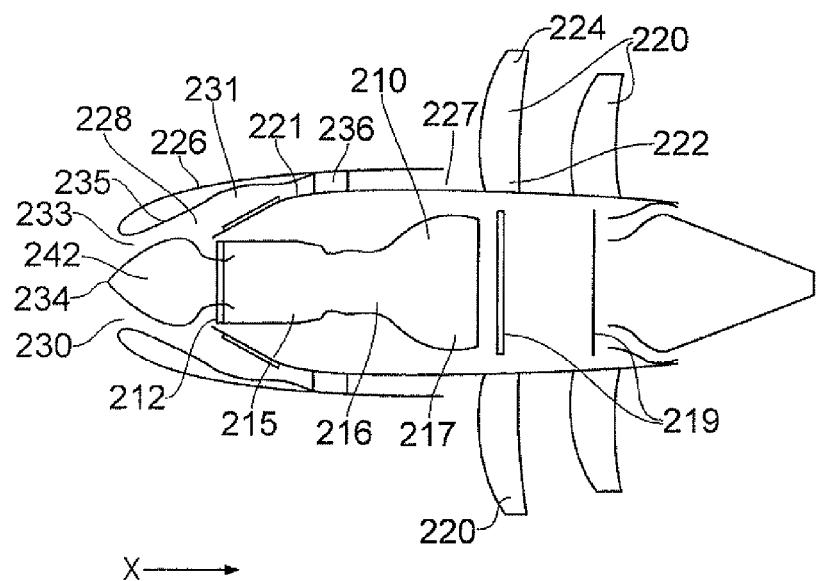
FIG. 5 is a diagrammatic cross sectional view of a pusher type gas turbine engine.

FIG. 5 shows a second embodiment of the invention comprising a pusher type propellor gas turbine engine 210. The gas turbine engine 210 is similar to the arrangement shown in FIG. 1, and comprises a core comprising a nacelle 221 which defines a core air intake 212. A centrebody 242 protrudes forwardly of the core air intake 212. The core air intake 212 leads to a compressor 215, combustor 216 and high and low pressure turbines 217, 219. The gas turbine engine 210 further comprises contra-rotating rotor stages having blades 220 driven by the low pressure turbine 219. Each of the blades 220 comprises a root portion 222 and a radially outer portion 224. Again, the root portion 222 extends from the radially inner end for approximately 15% to 25% of the radial length of the respective blade 220, with the radially outer portion 224 extending from the radially outer end of the root portion 222 to the radially outer end of the blade 220.

The gas turbine engine 210 further comprises a shroud 226. The shroud 226 is generally annular and surrounds part of the core and the centrebody 242. The shroud 226 comprises an inlet 230 located axially forwardly of the blades 220 and the core intake 212. By locating the shroud inlet 230 forward of the core intake 212, the shroud 226 can also function as an inlet debris separator, thereby preventing or deciding debris entry to the core. In other embodiments, the shroud inlet 230 could be located downstream of the core intake 212. The shroud 226 further defines an outlet 227 located downstream of the core intake 212 and upstream of the blades 220. The shroud 226 and core nacelle 221 together define a through passageway 228 extending between the inlet 230 and outlet 227. The shroud 226 is mounted to the nacelle 221 by a mounting arrangement comprising a plurality of struts 236 which extend between the shroud 226 and engine core nacelle 221. A surface heat exchanger 250 could also be located in the passageway 228.

The through passageway 228 comprises an acceleration region 233 which extends from the inlet 230 to a throat region 235, which is similar to the throat region 135 in that it defines a minimum cross sectional area portion of the passageway 228. The profile of the shroud 226 converges from a first area at the inlet 230, to a second, smaller area at the throat region 235. As a result, air entering the inlet 230 of the shroud 226 is accelerated as it flows in the axial direction toward the throat region 235 in use. The through passageway 228 also comprises a diffusion region 231 which extends from the throat region 235 to the outlet 227. The profile of the shroud 126, the centrebody 242 and the nacelle 221 are arranged such that the cross sectional area of the diffusion region 131 increases from the second area at the throat 235, to a third, larger area at the outlet 227. As a result, air flowing through the diffusion region 131 in the axial direction X from the throat region 235 to the outlet 227 is decelerated. As in the previous embodiment, air flowing through the passageway 228 is decelerated by the diffusion region 231 to a greater extent than it is accelerated by the acceleration region 233, such that the axial velocity of air exiting the outlet 227 is lower than air entering the inlet 230.

Figure 2:
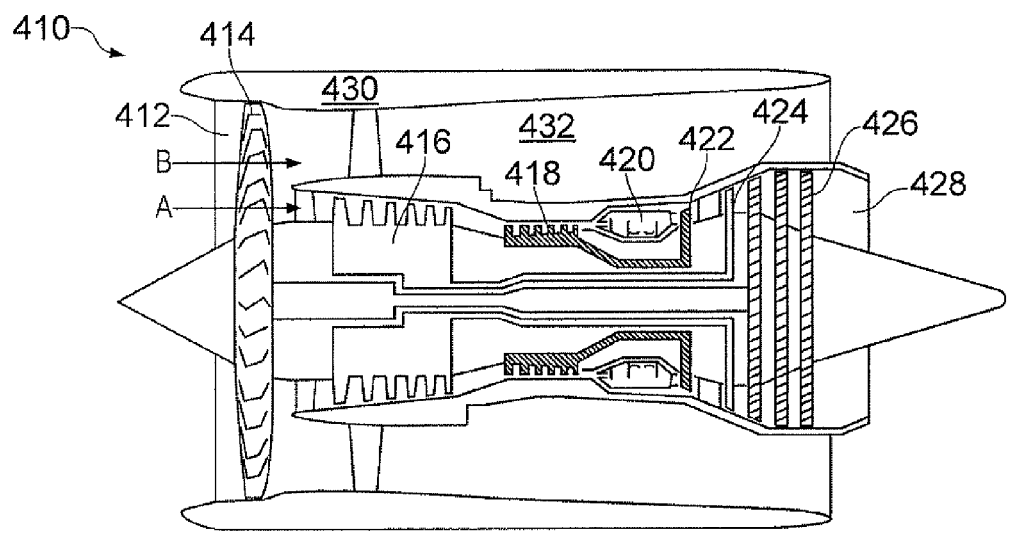
FIG. 2 is a diagrammatic cross sectional view of a turbofan gas turbine engine.
Figure 6:
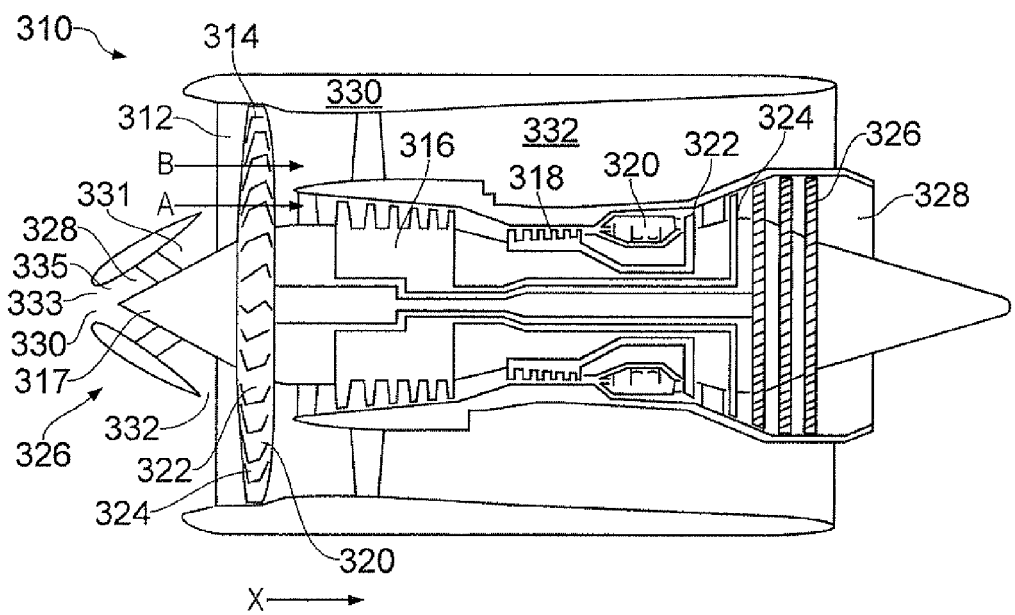
FIG. 6 is a diagrammatic cross sectional view of a turbofan type gas turbine engine.
Figure 7:
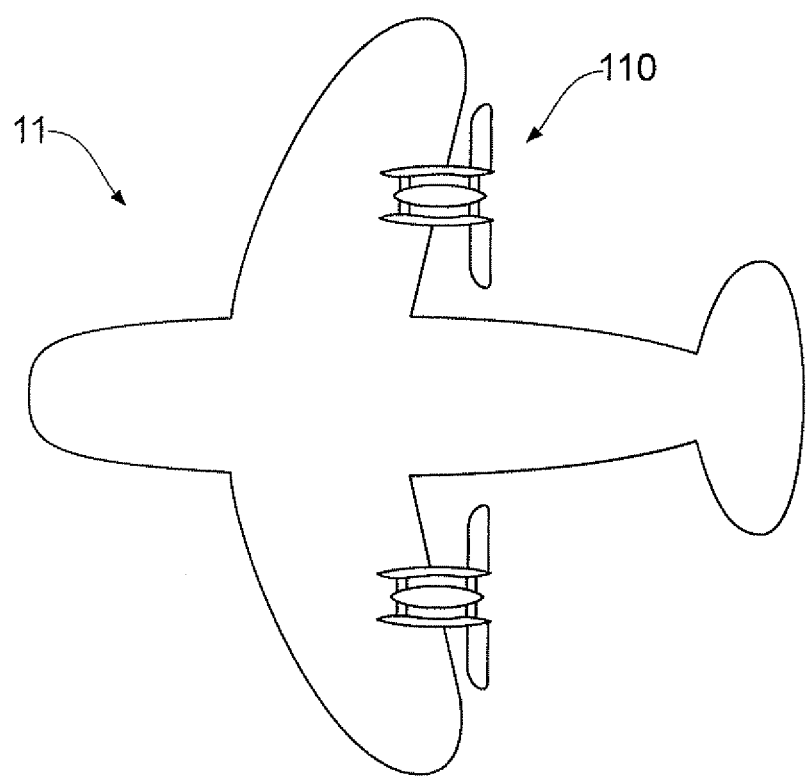
FIG. 7 is a plan view of an aircraft comprising a gas turbine engine.

FIG. 6 shows a third embodiment of the invention comprising a turbofan type gas turbine engine. The gas turbine engine is similar to the arrangement shown in FIG. 2, and comprises an air intake 312 and a propulsive fan 314, mounted to a hub 317, that generates two a core airflow A and a bypass airflow B. The gas turbine engine 310 comprises, in axial flow A, an intermediate pressure compressor 316, a high pressure compressor 318, a combustor 320, a high pressure turbine 322, an intermediate pressure turbine 324, a low pressure turbine 326 and an exhaust nozzle 328. A nacelle 330 surrounds the gas turbine engine 310 and defines, in axial flow B, a bypass duct 332.

The fan 314 comprises blades 320 having a root portion 322 extending from a radially inner end adjacent the hub 316 to an outer end part way radially outwardly, and a radially outer portion 324 extending from the outer end of the root portion 332 to the radially outer end of the blade 320. Again, the root portion extends 15% to 25% of the radial length of the blades 320, with the radially outer portion 324 extending along the rest of the blades 320. The fan 314 may comprise either a fixed or variable pitch type. The invention has found to be particularly suitable for fan gas turbine engines having variable pitch fans because such arrangements have been found to encounter a similar tradeoff between blade thickness and passage choking to propeller gas turbine engines.

The gas turbine engine 310 comprises a shroud 326 located axially forward of the fan 314. The shroud is mounted to the hub 316 and comprises an inlet 330, outlet 332 and a through passage 328 extending therebetween. The shroud 326 comprises an acceleration region 333 extending between the inlet 330 and a throat region 335, and a diffusing region 331 extending between the throat region 335 and outlet 332. The shroud 326 is configured such that air flowing through the through passage 328 in use is decelerated as it travels from the inlet 330 to the outlet 332.

The passageway 328 has radial extent such that air exiting the outlet 332 in use is directed substantially to the root portion 322 of the rotor blades 320 only.

The invention therefore provides an improved gas turbine engine 310 having a number of advantages over prior gas turbine engines. By virtue of the shroud 326, air approaching the root portion 322 of the blades 320 is decelerated. As a result, the aircraft can travel at higher speeds without encountering adverse aerodynamic effects such as wave drag or flutter for instance. Alternatively, the blade roots 322 can be designed to have a thicker profile, thereby providing increased robustness. A compromise between these design considerations could also be achieved.

The shroud has relatively low weight and provides relatively low drag in use, the drag provided by the shroud generally being offset by the improved aerodynamic performance of the blades. Where the shroud is mounted to the hub by struts, this can provide an efficient means for providing de-icing air to the blade roots, without compromising aerodynamic performance. The de-icing air can also in turn reduce the drag provided by the shroud by reducing the axial extent of the wake produced by the shroud as air flow around the shroud and through the passage.

Changes to the arrangement could be made without departing from the scope of the claimed invention. For instance, the shroud could be mounted to the wing or aircraft fuselage. Although the shroud is shown axially forward of the first rotor stage, the shroud could be located between the first and second rotor stages, provided the shroud is located ahead of at least one rotor stage. Aspects of any one embodiment could be incorporated in any of the other embodiments except where they are mutually exclusive.

The invention claimed is:

1. A propeller gas turbine engine having an axial flow direction therethrough in use, the propeller gas turbine engine comprising:
   one or more rotor stages, each rotor stage comprising at least one rotor blade, each rotor blade having a root portion; and
   a shroud located upstream of the one or more rotor stages relative to the axial flow direction, the shroud extending about a nose cone of the propeller gas turbine engine, wherein:
   the one or more rotor stages comprise two contra-rotating rotor stages,
   the shroud has an inner surface that cooperates with an outer surface of the nose cone to define a through passageway extending from an inlet at a leading edge of the shroud to an outlet at a trailing edge of the shroud, the shroud being configured to reduce an axial velocity of air exiting the outlet relative to the air entering the inlet in use,
   the trailing edge of the shroud is spaced from a core inlet of the propeller gas turbine engine in the axial flow direction, and
   the outlet is configured to direct the air exiting the outlet substantially towards the root portion of the at least one rotor blade.

2. The propeller gas turbine engine according to claim 1, wherein the outlet is configured to direct the air exiting the outlet substantially towards only the root portion of the at least one rotor blade.

3. The propeller gas turbine engine according to claim 1, wherein the shroud is mounted to a static structure of the propeller gas turbine engine.

4. The propeller gas turbine engine according to claim 1, wherein the shroud is mounted to one of the one or more rotor stages by a mounting arrangement.

5. The propeller gas turbine engine according to claim 4, wherein the one rotor stage to which the shroud is mounted comprises a hub, and the shroud is mounted to the hub by the mounting arrangement.

6. The propeller gas turbine engine according to claim 4, wherein the mounting arrangement comprises a strut extending between the shroud and the hub.

7. The propeller gas turbine engine according to claim 6, wherein the strut comprises an aerofoil profile.

8. The propeller gas turbine engine according to claim 6, wherein the strut comprises a duct for transmitting fluid from the hub to the shroud.

9. The propeller gas turbine engine according to claim 8, wherein the shroud comprises a duct having an inlet in fluid communication with the strut duct, and an outlet adjacent the outlet of the through passageway for transmitting the fluid to a trailing edge of the shroud.

10. The propeller gas turbine engine according to claim 9, wherein the fluid comprises compressed air.

11. The propeller gas turbine engine according to claim 1, wherein at least one of the one or more rotor stages comprises a hub, and the shroud is configured such that at least part of the through passageway surrounds the hub.

12. The propeller gas turbine engine according to claim 1, wherein the shroud is generally annular.

13. The propeller gas turbine engine according to claim 1, wherein the shroud comprises an annular aerofoil profile.

14. The propeller gas turbine engine according claim 1, wherein the shroud comprises an acceleration region located upstream of a diffusion region, the acceleration region being configured to increase the axial velocity of the air flowing therethrough, and the diffusion region being configured to decrease the axial velocity of the air flowing therethrough.

15. The propeller gas turbine engine according to claim 1, wherein the gas turbine engine comprises a puller configuration.

16. The propeller gas turbine engine according to claim 1, wherein one or more of the rotor stages comprises a variable pitch rotor blade configured to rotate about its own longitudinal axis.

17. An aircraft comprising the propeller gas turbine engine according to claim 1.

18. The propeller gas turbine engine according to claim 1, wherein the one or more rotor stages each comprises a hub, the root portion to which the outlet directs air extending 25% of a length of the blade from the hub.

\* \* \* \* \*